United States Patent

[11] 3,601,804

| [72] | Inventors | Charles Thomas Wainwright<br>Stevenage;<br>Peter H. Pearson, Letchworth, both of,<br>England |
|---|---|---|
| [21] | Appl. No. | 807,385 |
| [22] | Filed | Mar. 14, 1969 |
| [45] | Patented | Aug. 24, 1971 |
| [73] | Assignee | British Aircraft Corporation Limited<br>London, England |

[54] DIGITAL COMPARATOR UTILIZING DUAL CIRCUITS FOR SELF-CHECKING
3 Claims, 2 Drawing Figs.

| [52] | U.S. Cl. | 340/146.2,<br>340/146.1 |
|---|---|---|
| [51] | Int. Cl. | G06f 7/02,<br>G06f 11/00 |
| [50] | Field of Search | 340/146.2,<br>146.1; 235/153 |

[56] References Cited
UNITED STATES PATENTS

| 3,161,732 | 12/1964 | Martin et al. | 340/146.1 |
| 3,237,159 | 2/1966 | Emmons | 340/146.2 |
| 3,303,474 | 2/1967 | Moore et al. | 340/146.1 |
| 3,471,686 | 10/1969 | Connell | 235/153 |

Primary Examiner—Malcolm A. Morrison
Assistant Examiner—David H. Malzahn
Attorney—Kemon, Palmer and Estabrook ABSTRACT: The invention relates to a digital comparator for use in automatic test equipment for assessing whether a measured binary response from a test object lies within predetermined tolerance limits. The comparator includes two banks of identical comparator bit units with upper and lower registers for storing the upper and lower tolerance limits respectively. The measured response is compared initially with the upper tolerance limit and subsequently with the lower tolerance limit if the result of the first comparison indicates that the measured value is less than the upper tolerance limit. The two banks are gated together between each unit such that the comparison of any one bit only takes place if the comparison of the preceding bit produces an identical signal from each comparator bank.

DIGITAL COMPARATOR UTILIZING DUAL CIRCUITS FOR SELF-CHECKING

An essential unit in any equipment for automatically checking the correct functioning of a test object is the comparator. The responses of the test object at preselected points are assessed and automatically checked by the comparator against their known permissible tolerance limits at these points. If the response lies outside these limits the output signal from the comparator automatically halts the sequence of testing and the testing equipment can then respond to further instructions designed to locate the fault. To eliminate the possibility that the fault lies in the comparator itself the output signal may also initiate a self-checking routine but because of the importance of the comparator in the test system as a whole a faster acting and therefore a more continuously active self-checking system is really necessary.

According to the present invention a digital comparator for assessing whether a measured response from a test object lies within predetermined tolerance limits, comprises two banks of identical comparator bit units, each unit including an upper and a lower register into which the tolerance limit bits are serially loaded, and means for successively comparing each bit of the measured response with the corresponding bits of the tolerance limits until a signal is obtained indicating that the measured response is either within or outside the said tolerance limits. The comparator further comprises gating means comparing the result of each comparison in one bank with the corresponding comparison in the other bank, and indicator means operable whenever a discrepancy arises between the comparison signals derived from each bank. In the preferred form of the invention the response is the measured value of an electrical parameter at different points through an electrical circuit. Each comparator unit has an upper and a lower register and the tolerance limits for the measured parameter are fed into the upper and lower registers. The bits of the measured value are then compared serially with the upper register bits of each comparator unit. If a measured bit is higher than an upper register bit then, provided each bank produces the same response, the comparator registers a NO-GO HIGH signal and the sequence of testing is halted by closing a gate to the next unit.

If the measured bit equals an upper register bit then the output from the comparator unit enables an AND gate which is connected to the output from the corresponding unit on the adjacent bank. Hence the gate passes an actuating signal to the next unit only when it receives a signal from both banks. If this continues to the end of each bank, an "EQUALS" signal from the two end units produces a single GO-HIGH signal.

Similarly if in any unit a measured bit is lower than an upper register bit then each bank produces a GO-HIGH signal. Whenever a GO-HIGH signal appears, the comparison is switched to the lower registers. If the measured bit is higher than a lower register bit, then each bank produces a GO-LOW signal. The combination of a GO-HIGH and a GO-LOW signal from each of the banks applied to a GO-NOGO logic circuit produces a single GO signal which indicates the comparison is completed and the measured value lies within the prescribed tolerance limits. If however the measured bit had been lower than the lower register bit then, provided each bank showed the same response, a NO-GO LOW signal would have been produced and the sequence of testing again halted. If the measured bit is equal to the lower register bit then the comparison proceeds serially along the lower register bits in the same way as for the upper register bits until a GO-LOW or NO-GO-LOW signal is produced. The comparator may be extended to accommodate negative values, in which case polarity signals are also fed to the logic circuits.

Thus, whatever the result of the comparison in any particular unit, a final instruction signal will only appear when an identical signal is received from each of the comparator banks. This continues active checking of one comparator bank against another eliminates almost entirely the possibility of a fault in the comparators being mistaken for a fault in the system being tested.

Additionally each signal from a comparator unit can be accompanied by a related self-check signal which is passed to a self-check circuit continually monitoring the performance of the comparator.

One example of the invention will now be described with reference to the accompanying drawings, in which.

Figure 1:
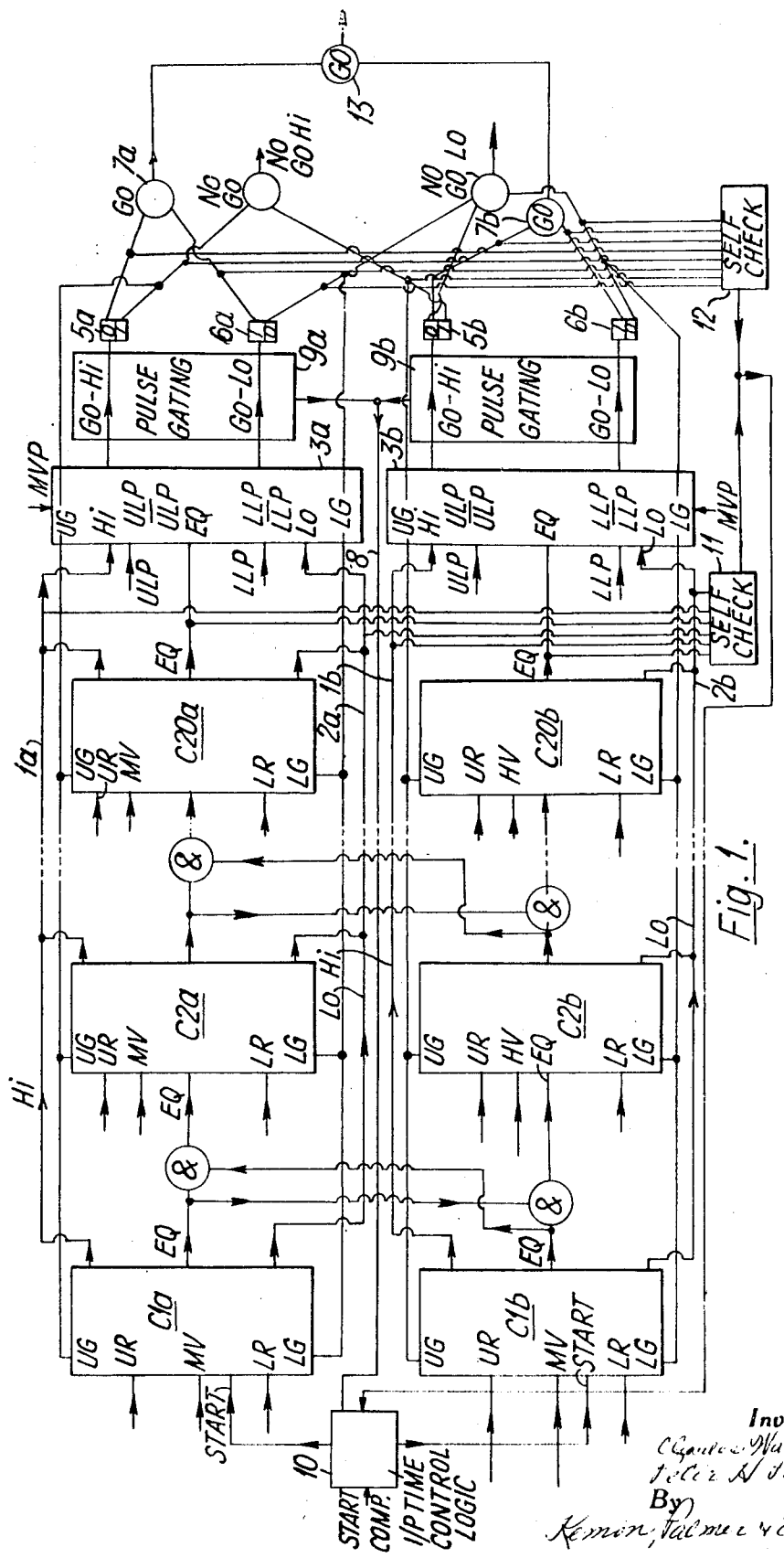
FIG. 1 is a block circuit diagram of a two bank comparator.

In FIG. 1 there are 20 comparator units C in each bank but for clarity only three are shown, C1, C2 and C20. Each unit has an upper limit register UR, a lower register LR and a measured value register MV. The registers are initially filled with the numbers to be assessed and a comparison start signal is then applied to the units C1A and C1B from the input time control logic.

The upper gates UG are then opened and the bit in the measured value register is compared against the bit in the upper register. If both units show the bits to be equal they each produce an "EQUALS" output signal EQ which is applied to an AND gate between C1 and C2. This consequently opens and a signal is passed to the unit C2 where the next less significant measured value bit is compared with the corresponding upper register bit. If the measured value bit is found to be equal to the upper register bit in each unit along each bank the final output signal EQ from the units C20 would be applied to the interrogation logic unit 3 to produce a final GO signal.

Returning to the comparison in C1, if the measured value bit is greater than the upper register bit a Hi signal is passed along the lines 1A and 1B into the interrogation logic 3 where it is combined with the measured value and upperlimit polarity signals. If the logic circuits deduce that the measured value is arithmetically higher than the upper tolerance limit the bistable switches 5 will remain in their normal "1" state. A signal indicating that the comparison is completed applied to the GO-NOGO logic therefore produces a NOGO Hi signal.

If the C1 comparison indicates that the measured value bit is lower than the upper register bit a Lo signal is passed along the lines 2A and 2B to the interrogation logic which determines whether the measured value is arithmetically below the upper limit. If so, the bistable switches 5 are switched to the "0" state to represent a Go Hi signal. To determine whether the measured value lies within the tolerance limit the comparison is therefore switched to the lower registers. The lower gates LG are opened and if the next less significant measured value bit is greater than the corresponding lower register bit then a Hi signal is passed to the interrogation logic where it is combined with lower limit and measured value polarity signals. This determines whether the measured value is arithmetically above the lower limit and, if so, the binary switches 6 are switched to the "1" state to represent a Go Lo signal. With the binary switches 5 and 6 switched to the "0" and "1" states respectively in each bank the GO gates 7 are enabled and these in turn enable the final GO gate 8.

If the measured value bit is lower than the lower register bit then a Lo signal is passed to the interrogation logic. If it is a true Lo signal i.e. the measured value is arithmetically lower than the lower limit, then a NOGOLO signal is produced in the same way as for the NO GO Hi signal. If the measured value bit is equal to the lower register bit then the comparison continues serially along the lower registers until either the final unit is reached or a Hi or Lo signal is produced.

A comparison will only continue as long as the start signal from the input logic is present. During the transition from the upper gate UG to the lower gate LG the start signal is removed by feeding an inhibit signal from the pulse gating units 9 along the line 8 to the input logic circuit 10. Furthermore, if a fault occurs in the comparator the start signal should be held in the input logic so that the fault can be located without any changes occuring in the measured value register. An output signal from either of the self-check detection boxes 11 or 12 is therefore fed back to the input control logic to halt the comparison while the fault is located. The inputs to the self-check detection boxes are taken from the inputs into the interrogation logic circuits and from the outputs of the binary switches. The signals from each bank are therefore compared at these points and if any differences exist the comparison is halted.

The comparison method may best be understood by considering the following numerical examples. Although the comparator deals with 20-bit numbers, only 4-bit numbers are used in the following examples for clarity:

|      | Case 1       | (13Case 2    | Case 3    |
|------|--------------|--------------|-----------|
| UR   | 1101 (13)    | 1101 (13)    | 1101 (13) |
| MV   | 0110 (6)= Go | 1110 (14)    | 0001 (1)  |
|      |              | No Go Hi     | No Go Lo  |
| LR   | 0010 (2)     | 0010 (2)     | 0010 (2)  |

In case 1, the most significant (MS) bit position (binary value 8) of the MV is found to contain a 0 where the corresponding position of the UR contains a 1, i.e. the MV cannot possibly be greater than 7 or the UR less than 8, therefore the MV is lower than the UR and comparison of that limit ceases, transferring to the LR. The bit positions of the MV and LR both contain 0 and comparison continues at the next less significant position, (binary value 4). In this position the MV contains a 1 and the LR a 0 i.e. the MV cannot be less than 4 or the LR more than 3, therefore the MV is greater than the LR. With the MV less than the UR and greater than the LR, comparison ceases and a Go decision is produced.

In case 2, the first two most significant bit positions of the MV and UR contain a 1 and are equal, and the comparison continues to the third least significant position (binary value 2). At this position the MV contains a 1 and the UR a 0, proving that the MV must be at least greater in value than the UR, and that the MV lies outside the upper limit. The signal No Go Hi results, and comparison stops; comparison with the LR is not necessary and is not effected.

In Case 3, it can be seen that UR comparison ceases at the MS digit, and comparison continues with the LR. The first bit position to show a difference is the third most significant; Mv=0, LR=1. This proves the MV to be a maximum of 1 and the LR a minimum of 2, i.e. the MV is below the LR, and outside the limit. The signal No Go Lo results and comparison stops.

Figure 2:
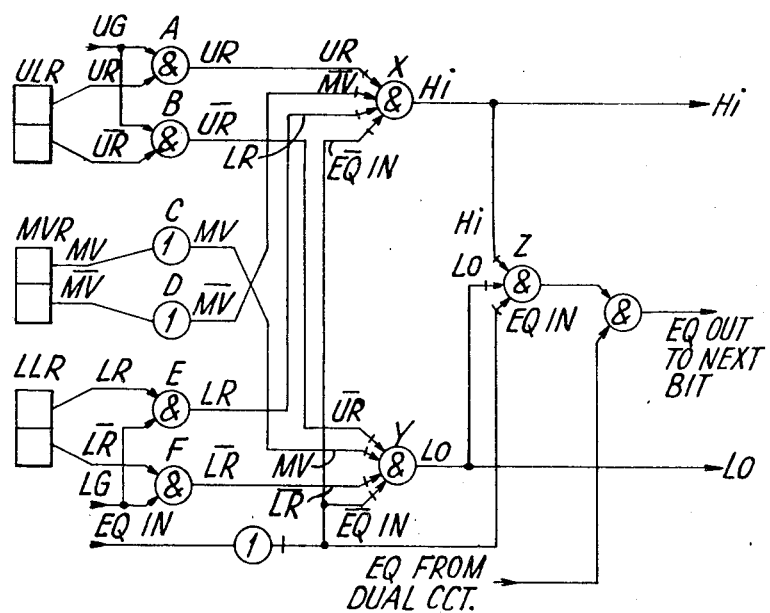
FIG. 2 is a simplified diagram of the comparator logic of a single bank.

The explanation of the comparator logic will now be described with reference to FIG. 2 and to the truth table of the gate operation given in Table 1 below.

The 1's and 0's of the truth table represent the logic states at the outputs of the gates and the input and output signals, i.e. logic 0 represents 0v, logic 1'0 represents +22v.

The gating level EQ is inverted and enables gates X, Y and Z; it is present throughout a comparison. During a comparison of MV with UR, the gating level UG is present and enables gates A and B, while LG is absent and puts the outputs of E and F to 0. Similarly, during comparison of MV with LR, the gating level LG is present and enables gates E and F, while UG is absent and puts the outputs from A and B to 0. An equals output (dual) EQ from a comparator bit is propagated rapidly to the next least significant bit.

The presence of a 1 in the register bistable, for instance the UR bistable, causes the outputs UR and $\overline{UR}$ to be logic 1 and 0 respectively; a 0 stored in the bistable causes the outputs to be 0 and 1 respectively.

Taking the first case shown in the truth table when the MV is above the UR; UR is 0, $\overline{UR}$ is 1, i.e. UR contains 0, and MV is 1 and $\overline{MV}$ 0 i.e. MVR contains 1. $\overline{UR}$ in combination with the gating level UG, enables gate B, while gate A is inhibited by the absence of UR. Gates E and F are inhibited by the absence of the gating signal LG. With UR, $\overline{MV}$, LR and $\overline{EQ}$ all at logic 0 the output of X is 1, i.e. Hi is produced. The output of Y is 0 as any one input at 1 (both $\overline{UR}$ and MV are 1) negates the output. Gates X, Y and Z require their inputs to be at OV to produce a 1 output as shown by the bar in the inputs; anyone or more inputs at 1, causes a 0 output.

The operation of the remaining cases is summarized in the truth table and follows in a similar way to the description given above.

The polarity of the values used in comparison may be taken into account such that numbers are compared arithmetically and not numerically. For example, if an MV of say −12 is compared with an upper limit of say +6, although numerically −12 is greater than +6, arithmetically it is not, and the interrogation logic proves it so.

TABLE 1.—TRUTH TABLE FOR SIMPLIFIED COMPARATOR LOGIC DIAGRAM

| Inputs | | | | Gating signals | | Gate X inputs | | | | | Gate Y inputs | | | | | Z |
|---|---|---|---|---|---|---|---|---|---|---|---|---|---|---|---|---|
| UR | MV | LR | EQ IN | UG | LG | UR | $\overline{MV}$ | LR | $\overline{EQ}$ IN | O/P Hi | $\overline{UR}$ | MV | $\overline{LR}$ | $\overline{EQ}$ IN | O/P Lo | O/P EQ |
| Above UR | 0 | 1 | | 1 | 1 | 0 | 0 | 0 | 0 | 0 | 1 | 1 | 1 | 0 | 0 | 0 | 0 |
| Equal UR | 1 | 1 | | 1 | 1 | 0 | 1 | 0 | 0 | 0 | 0 | 0 | 1 | 0 | 0 | 0 | 1 |
| | 0 | 0 | | 1 | 1 | 0 | 0 | 1 | 0 | 0 | 0 | 1 | 0 | 0 | 0 | 0 | 1 |
| Below UR | 1 | 0 | | 1 | 1 | 0 | 1 | 1 | 0 | 0 | 0 | 0 | 0 | 0 | 0 | 1 | 0 |
| Above LR | | 1 | 0 | 1 | 0 | 1 | 0 | 0 | 0 | 0 | 1 | 0 | 1 | 1 | 0 | 0 | 0 |
| Equal LR | | 1 | 1 | 1 | 0 | 1 | 0 | 0 | 1 | 0 | 0 | 0 | 1 | 0 | 0 | 0 | 1 |
| | | 0 | 0 | 1 | 0 | 1 | 0 | 1 | 0 | 0 | 0 | 0 | 0 | 1 | 0 | 0 | 1 |
| Below LR | | 0 | 1 | 1 | 0 | 1 | 0 | 1 | 1 | 0 | 0 | 0 | 0 | 0 | 0 | 1 | 0 |

We claim:

1. A digital comparator for assessing whether a measured binary response from a test object lies within predetermined tolerance limits, comprising: two banks of identical comparator bit units, each unit including an upper register for storing one bit of the upper tolerance limit, a lower register for storing one bit of the lower tolerance limit, a measured value register for storing one bit of the measured binary response, and comparison gating means having inputs responsive to the bits in each of the said registers, each unit having first, second and third outputs for signals indicating whether the measured bit is higher than, within, or lower than the tolerance limits respectively; each unit further including input gating means operable in a first state to cause said comparison gating means to compare the measured response bit with the upper register bit and operable in a second state to cause the comparison gating means to compare the measured response bit with the lower register bit; the comparator further including means responsive to said first output for switching the input gating means from the first state to the second state, the said second output from each unit being connected through further gating means to the input of the next unit in both of the said banks whereby the comparison of the successive bits is halted unless the respective output signals from the corresponding units in the two banks are identical.

2. A comparator according to claim 1 including further gating means having inputs responsive to the final output signals from each bank indicating whether the measured response is within or outside the tolerance limits whereby a final output signal from the comparator indicating whether the measured response lies within or outside the tolerance limits is only obtained if the assessment of the measured response obtained from each bank is identical.

3. A comparator according to claim 1 in which said input gating means includes an upper gate and a lower gate, said first state comprising the upper gate open and the lower gate closed, and said second state comprising the upper gate closed and the lower gate open.